(12) United States Patent
Lasseigne

(10) Patent No.: US 7,399,017 B1
(45) Date of Patent: Jul. 15, 2008

(54) BUCKET LIFTING DEVICE

(76) Inventor: Bryon P. Lasseigne, 4615 Loreauvile Rd., New Iberia, LA (US) 70563

( * ) Notice: Subject to any disclaimer, the term of this patent is extended or adjusted under 35 U.S.C. 154(b) by 0 days.

(21) Appl. No.: 11/562,780

(22) Filed: Nov. 22, 2006

(51) Int. Cl.
*B65G 7/12* (2006.01)
*B65D 25/28* (2006.01)

(52) U.S. Cl. .................... 294/31.2; 294/165; 220/758; 16/425

(58) Field of Classification Search .............. 294/15, 294/27.1, 31.2, 32, 119.2, 165; 220/758, 220/772; 16/425, 426
See application file for complete search history.

(56) References Cited

U.S. PATENT DOCUMENTS

| | | | |
|---|---|---|---|
| 140,527 A * | 7/1873 | Munson, Jr. ............. 220/758 |
| 1,242,994 A * | 10/1917 | Skiff ...................... 222/472 |
| 1,460,268 A * | 6/1923 | Ottman .................. 294/15 |
| 1,678,483 A * | 7/1928 | Ruggiero ................ 384/549 |
| 2,740,655 A * | 4/1956 | Maly ...................... 294/31.2 |
| 2,967,071 A | 1/1961 | Deschene |
| 2,966,714 A | 9/1961 | Ritchie |
| 3,615,115 A * | 10/1971 | Simms ................... 294/31.2 |
| 3,964,126 A * | 6/1976 | Madsen .................. 294/31.2 |
| 3,997,072 A * | 12/1976 | Guth ...................... 220/324 |
| 5,013,074 A | 5/1991 | Galle |
| 5,445,425 A | 8/1995 | Lyver |
| D403,162 S | 12/1998 | Williams |
| 5,967,362 A * | 10/1999 | Corbin ................... 220/758 |
| 6,161,885 A * | 12/2000 | Walker ................... 294/31.2 |
| 6,416,096 B1 * | 7/2002 | Stefanik et al. ......... 294/16 |
| 6,651,838 B2 | 11/2003 | Bissell |
| 7,284,777 B1 * | 10/2007 | Kraemer ................. 294/31.2 |

\* cited by examiner

*Primary Examiner*—Dean J Kramer

(57) ABSTRACT

A bucket lifting device for facilitating lifting and tipping of a bucket to empty the contents of the bucket includes a sleeve receiving a bottom end of the bucket, wherein the sleeve extends around a portion of the bucket. A handle is coupled to the sleeve. The handle is graspable to facilitate lifting and tipping of the bucket when the sleeve receives the bottom end of the bucket.

9 Claims, 6 Drawing Sheets

BUCKET LIFTING DEVICE

BACKGROUND OF THE INVENTION

1. Field of the Invention

The present invention relates to bucket harness devices and more particularly pertains to a new bucket harness device for facilitating lifting and tipping of a bucket to empty the contents of the bucket.

2. Description of the Prior Art

The use of bucket harness devices is known in the prior art. While these devices fulfill their respective, particular objectives and requirements, the need remains for a device that has certain improved features that accommodates buckets of varying sizes. Additionally, the device should be graspable adjacent a bottom end of the bucket to facilitate tipping of the bucket.

SUMMARY OF THE INVENTION

The present invention meets the needs presented above by generally comprising a sleeve receiving a bottom end of the bucket, wherein the sleeve extends around a portion of the bucket. A handle is coupled to the sleeve. The handle is graspable to facilitate lifting and tipping of the bucket when the sleeve receives the bottom end of the bucket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
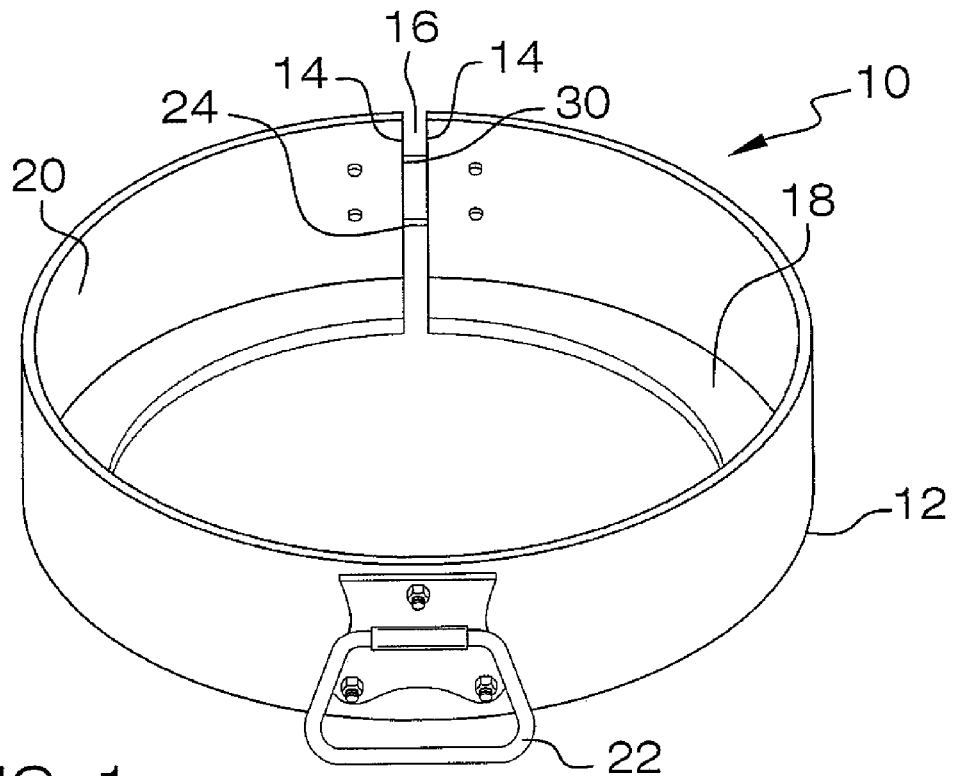
FIG. 1 is a top perspective view of a bucket lifting device according to the present invention.
Figure 2:
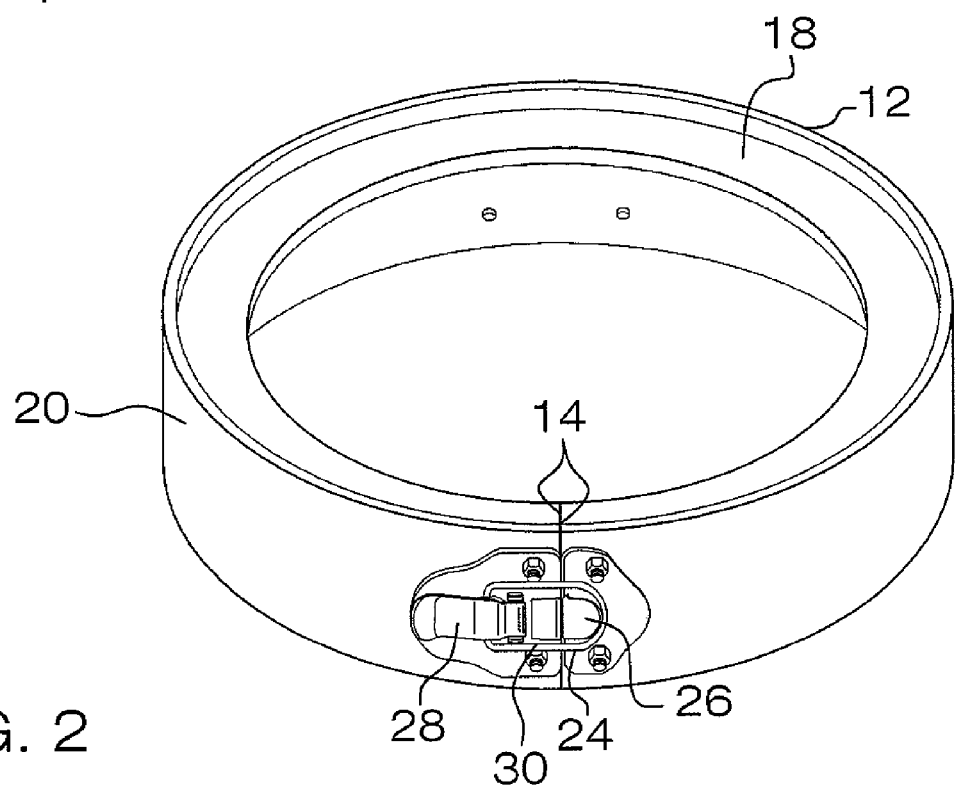
FIG. 2 is a bottom perspective view of the present invention.
Figure 3:
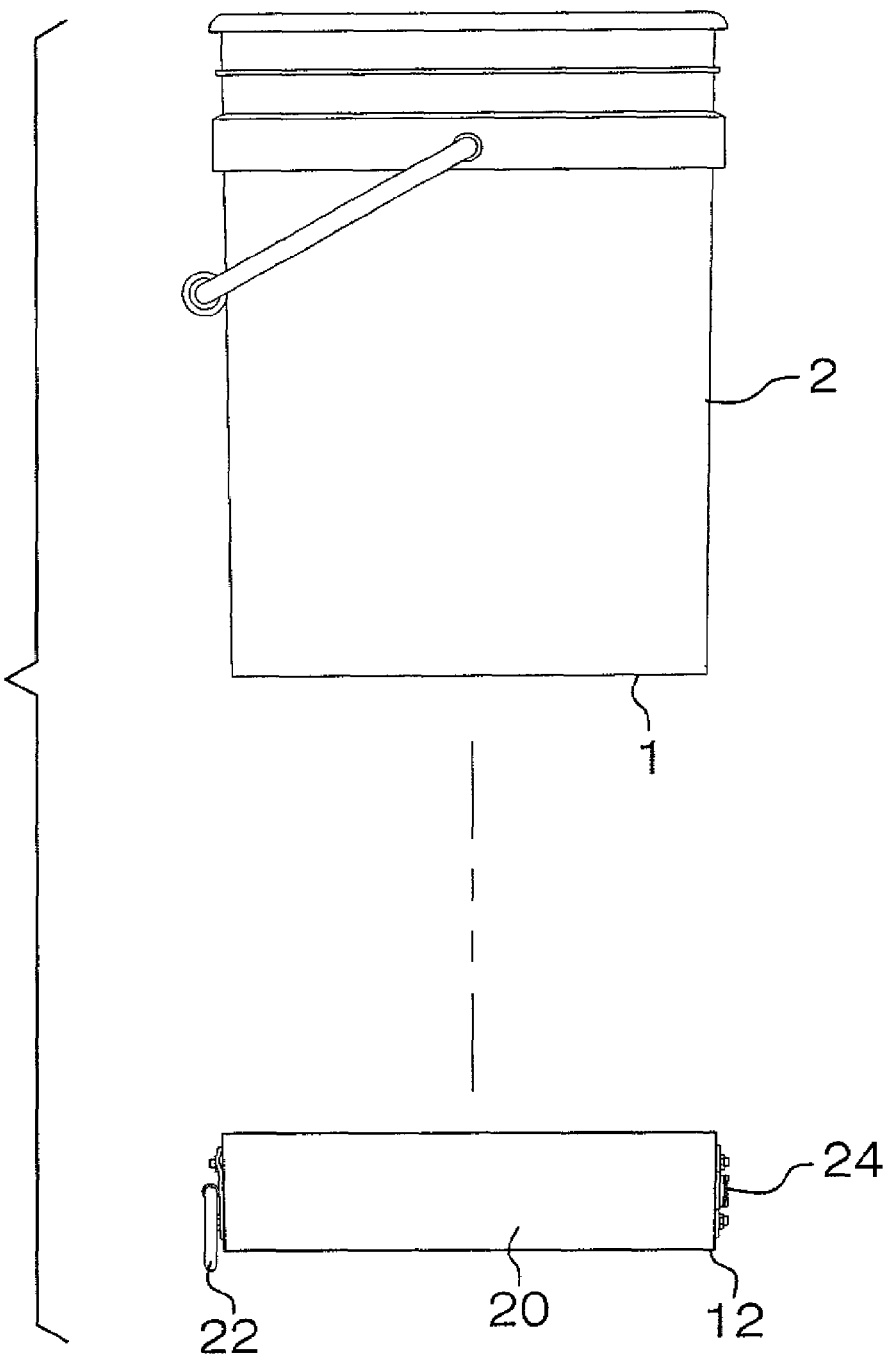
FIG. 3 is an exploded side view of the present invention shown exploded away from the bucket.
Figure 4:
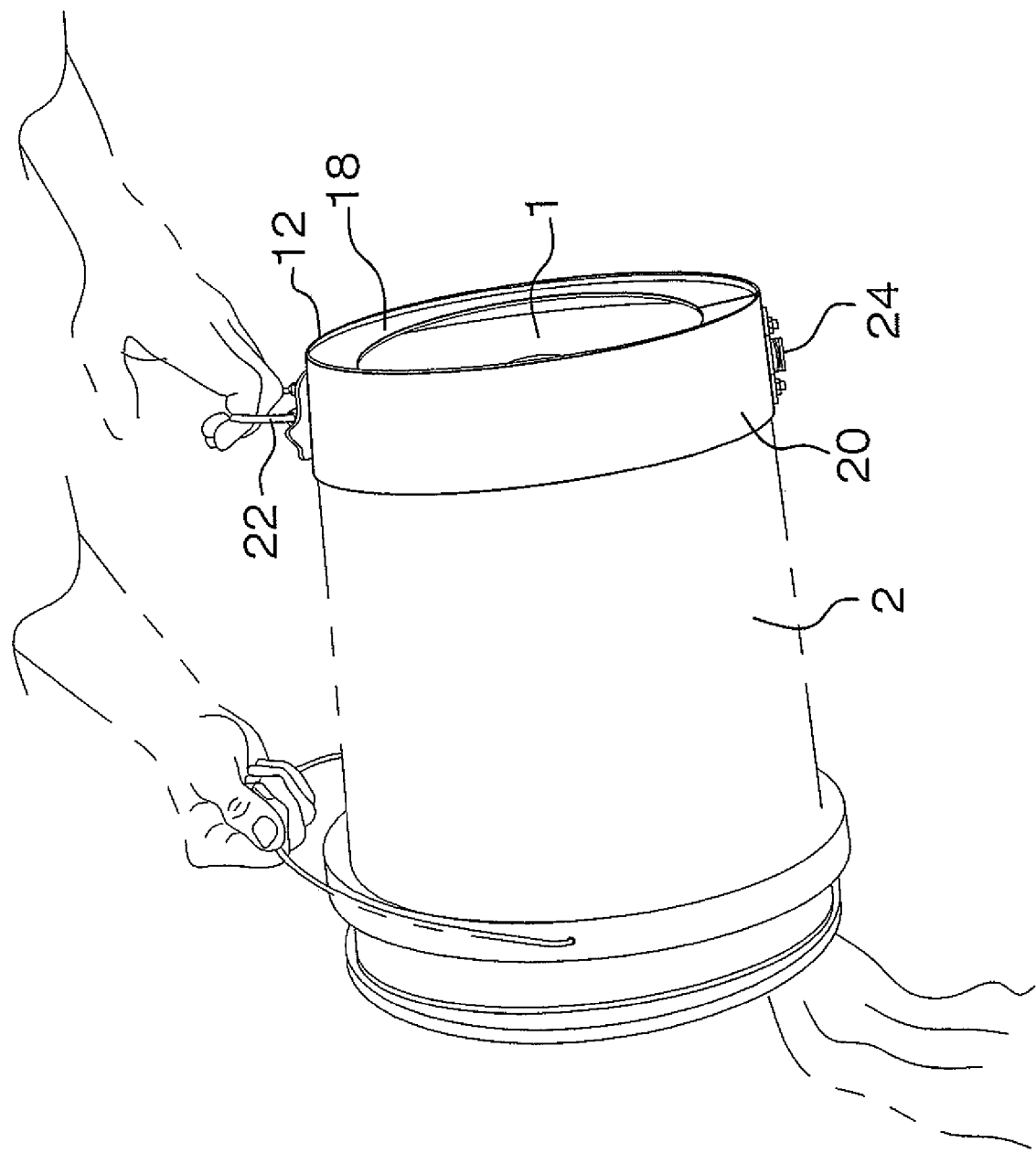
FIG. 4 is a side perspective view of the present invention in use to tip the bucket.

With reference now to the drawings, and in particular to FIGS. 1 through 4 thereof, a new bucket harness device embodying the principles and concepts of the present invention and generally designated by the reference numeral 10 will be described.

As best illustrated in FIGS. 1 through 4, the bucket 2 lifting device 10 generally comprises a sleeve 12 receiving a bottom end 1 of a bucket 2, wherein the sleeve 12 extends around a portion of the bucket 2. The sleeve 12 includes a pair of terminal ends 14 defining a split 16 therebetween to permit expansion and contraction of the sleeve 12 to accommodate buckets 2 of varying sizes. The sleeve 12 includes a base wall 18 and a peripheral wall 20 extending upwardly from the base wall 18. The base wall 18 abuts the bottom end 1 of the bucket 2 when the sleeve 12 receives the bottom end 1 of the bucket 2. The peripheral wall 20 extends along the portion of the bucket 2 when the bottom end 1 of the bucket 2 abuts the base wall 18.

A handle 22 is hingedly coupled to the sleeve 12. The handle 22 is graspable to facilitate lifting and tipping of the bucket 2 when the sleeve 12 receives the bottom end 1 of the bucket 2. The handle 22 is positioned diametrically opposite the split 16 in the sleeve 12.

A latch assembly 24 is coupled to the sleeve 12. The latch assembly 24 is actuated to compress the sleeve 12 against the bucket 2 to secure the sleeve 12 to the bucket 2. The latch assembly 24 includes a receiving nub 26 coupled to the peripheral wall 20 adjacent one of the terminal ends 14. A lever 28 is hingedly coupled to the peripheral wall 20 adjacent one of the terminal ends 14 and positioned across the split 16 from the receiving nub 26.

The latch assembly 24 also includes a cinching ring 30 pivotally coupled to the lever 28. The cinching ring 30 is extended across the split and extended around the receiving nub 26. The cinching ring 30 draws the terminal ends 14 together to compress the sleeve 12 around the bucket 2 when the lever 28 to pivoted towards the sleeve 12.

Figure 5:
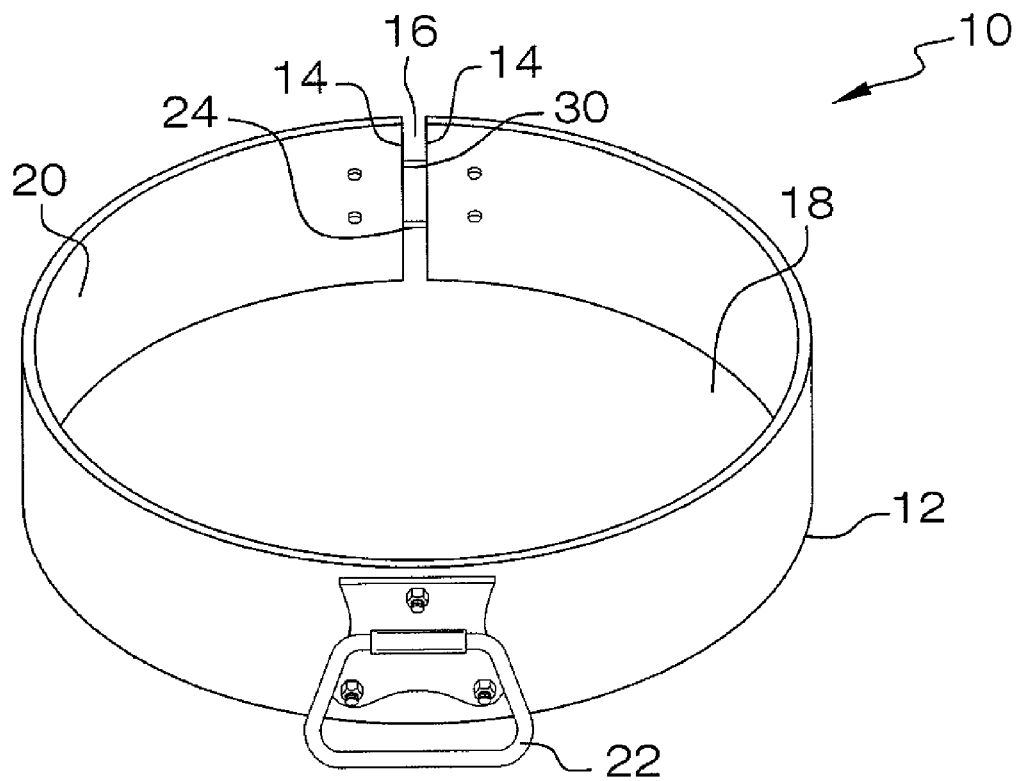
FIG. 5 is a top perspective view of an embodiment of the present invention.
Figure 6:
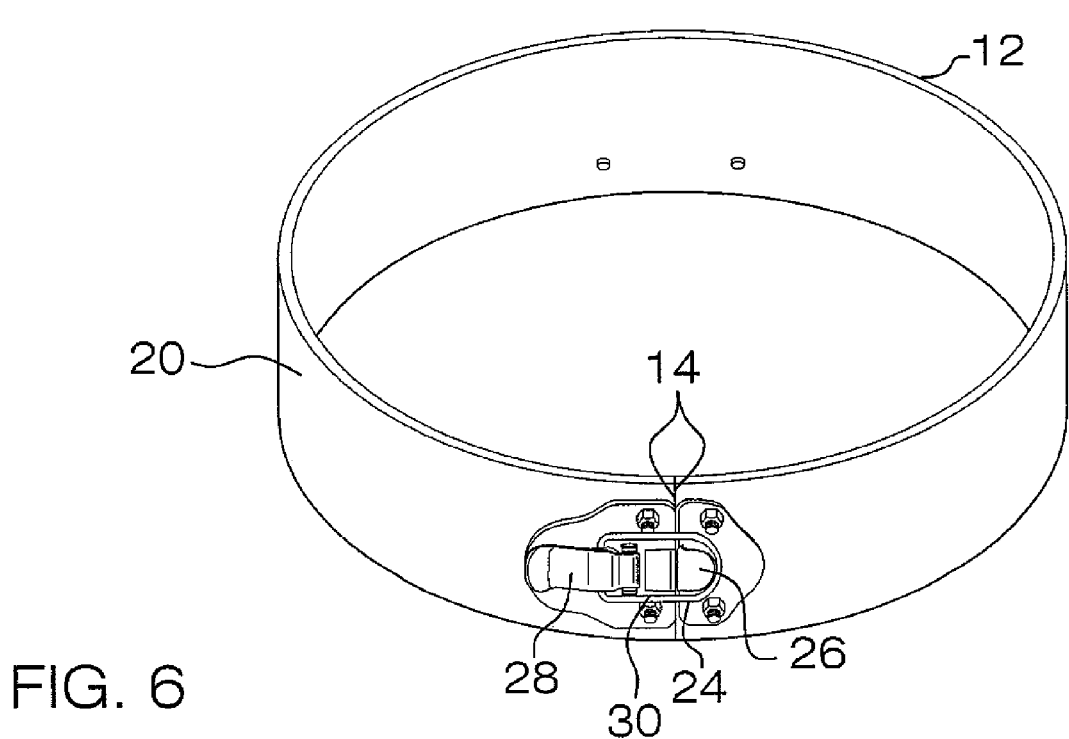
FIG. 6 is a bottom perspective view of the embodiment of the present invention shown in FIG. 5.
Figure 7:
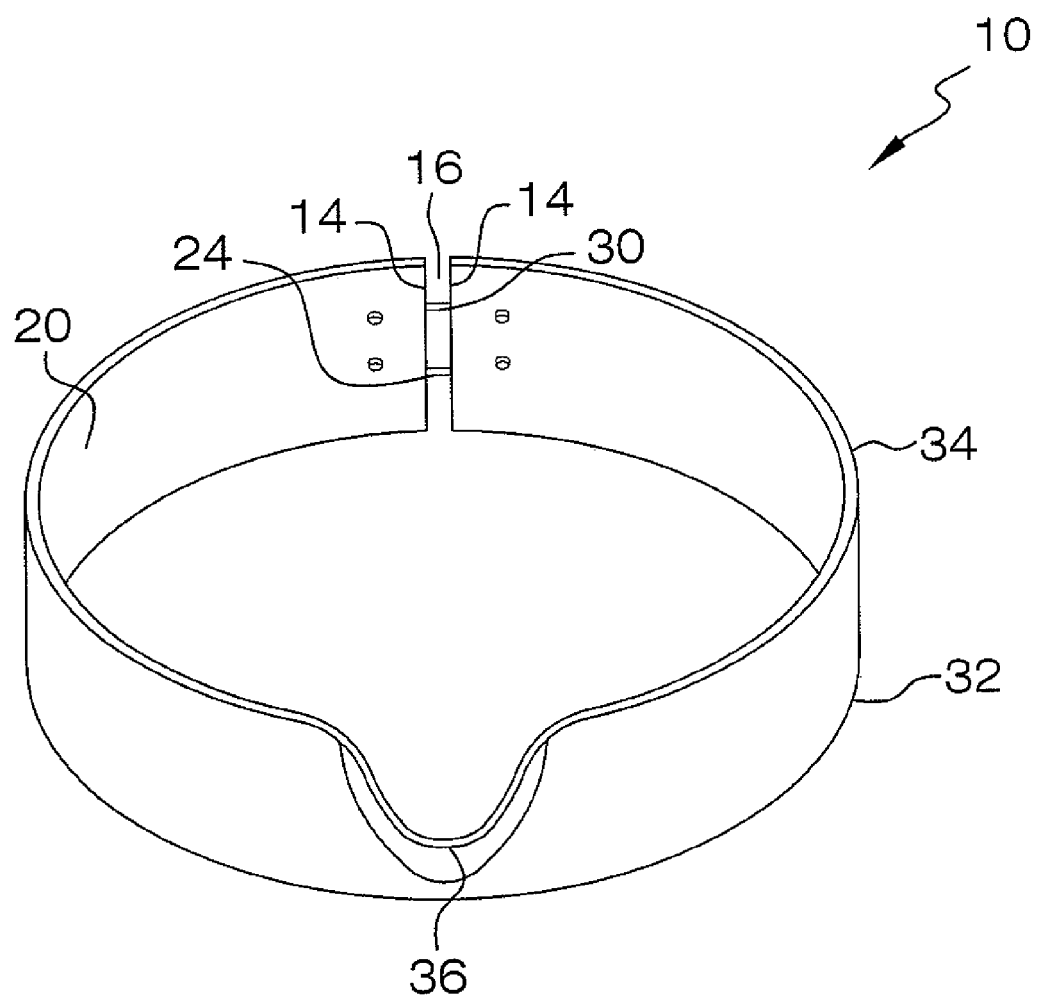
FIG. 7 is a top perspective view of an embodiment of the present invention.
Figure 8:
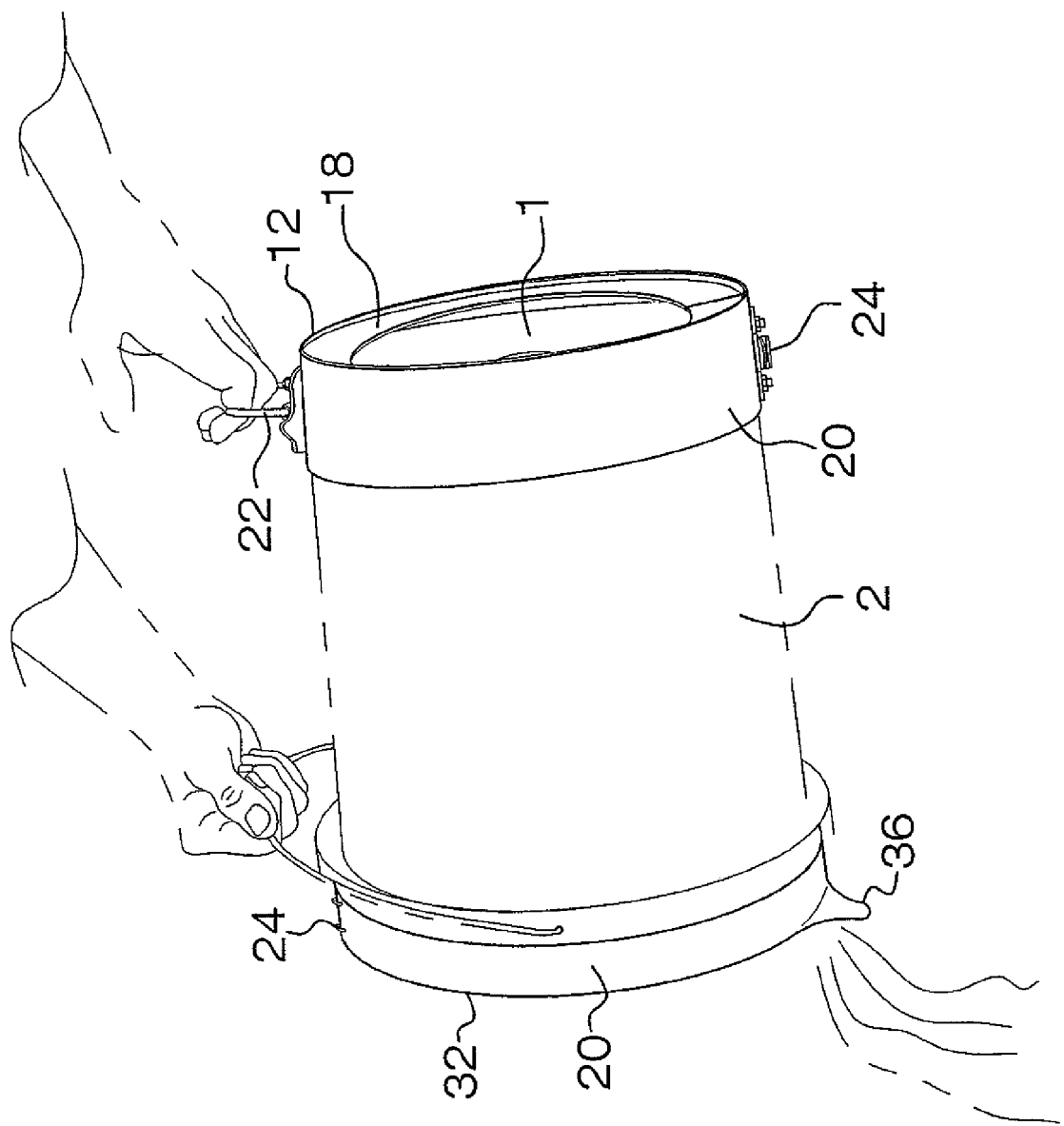
FIG. 8 is a side perspective view of the present invention shown in FIG. 1 and the embodiment shown in FIG. 7 being used together on a bucket.

In an embodiment, as shown in FIGS. 5 and 6, the sleeve 12 has only the peripheral wall 20 to allow the sleeve 12 to be placed at a variety of places along the bucket 2. In an embodiment, as shown in FIGS. 7 and 8, has a second sleeve 32 that does not include the handle 22 and only has the peripheral wall 20. A portion of the second sleeve 32 adjacent a top edge 34 protrudes outwardly to form a pour spout 36. The pour spout 36 is positioned diametrically opposite the latch assembly 24. The second sleeve 32 in this embodiment is positioned on the bucket 2 opposite the sleeve 12. The pour spout 36 helps to direct the liquid being poured from the bucket 2.

In use, the bottom end 1 of the bucket 2 is inserted into the sleeve 12 so that the bottom end 1 abuts the base wall 18 and the peripheral wall 20 extends partially up of a portion of the bucket 2. The cinching ring 30 is extended around the receiving nub 26 and the lever 28 is pivoted to draw the terminal ends 14 together and compress the sleeve 12 against the bucket 2. The handle 22 is grasped while the bucket 2 is being lifted to facilitate lifting of the bucket 2 and tipping of the bucket 2 to pour the contents of the bucket 2 out.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bucket lifting device for facilitating lifting and tipping of a bucket, said device comprising:
   a sleeve receiving a bottom end of the bucket, wherein said sleeve extends around a portion of the bucket;
   a handle being coupled to said sleeve, said handle being graspable to facilitate lifting and tipping of the bucket when said sleeve receives the bottom end of the bucket; and
   a second sleeve being positioned around the bucket opposite said sleeve, wherein said second sleeve extends around a portion of the bucket, a portion of said second sleeve adjacent a top edge of said second sleeve protrudes outwardly to form a pour spout, said flour spout facilitating directing of a flow liquid from the bucket when the bucket is tipped, said second sleeve including a pair of terminal ends defining a split therebetween to permit expansion and contraction of said second sleeve to accommodate buckets of varying sizes, said terminal ends being positioned diametrically opposite said pour spout.

2. The device according to claim 1, wherein said sleeve includes a pair of terminal ends defining a split therebetween to permit expansion and contraction of said sleeve to accommodate buckets of varying sizes, said handle being positioned diametrically opposite said split in said sleeve.

3. The device according to claim 2, further comprising a latch assembly being coupled to said sleeve, said latch assembly being actuated to compress said sleeve against the bucket to secure said sleeve to the bucket.

4. The device according to claim 3, wherein said latch assembly includes a receiving nub being coupled to said sleeve adjacent one of said terminal ends.

5. The device according to claim 4, wherein said latch assembly includes a lever being hingedly coupled to said sleeve adjacent one of said terminal ends and positioned across said split from said receiving nub.

6. The device according to claim 5, wherein said latch assembly includes a cinching ring being pivotally coupled to said lever, said cinching ring being extended across said split and extending around said receiving nub, said cinching ring drawing said terminal ends together to compress said sleeve around the bucket when said lever to pivoted towards said sleeve.

7. The device according to claim 1, wherein said sleeve includes a base wall and a peripheral wall extending upwardly from said base wall, said base wall abutting the bottom end of the bucket when said sleeve receives the bottom end of the bucket, said peripheral wall extending along the portion of the bucket when the bottom end of the bucket abuts said base wall.

8. The device according to claim 1, further comprising a latch assembly being coupled to said sleeve, said latch assembly being actuated to compress said sleeve against the bucket to secure said sleeve to the bucket.

9. A bucket lifting device for facilitating lifting and tipping of a bucket, said device comprising:
   a sleeve receiving a bottom end of the bucket, wherein said sleeve extends around a portion of the bucket, said sleeve including a pair of terminal ends defining a split therebetween to permit expansion and contraction of said sleeve to accommodate buckets of varying sizes, said sleeve including a base wall and a peripheral wall extending upwardly from said base wall, said base wall abutting the bottom end of the bucket when said sleeve receives the bottom end of the bucket, said peripheral wall extending along the portion of the bucket when the bottom end of the bucket abuts said base wall;
   a handle being hingedly coupled to said sleeve, said handle being graspable to facilitate lifting and tipping of the bucket when said sleeve receives the bottom end of the bucket, said handle being positioned diametrically opposite said split in said sleeve;
   a latch assembly being coupled to said sleeve, said latch assembly being actuated to compress said sleeve against the bucket to secure said sleeve to the bucket, said latch assembly comprising;
      a receiving nub being coupled to said peripheral wall adjacent one of said terminal ends;
      a lever being hingedly coupled to said peripheral wall adjacent one of said terminal ends and positioned across said split from said receiving nub; and
      a cinching ring being pivotally coupled to said lever, said cinching ring being extended across said split and extending around said receiving nub, said cinching ring drawing said terminal ends together to compress said sleeve around the bucket when said lever to pivoted towards said sleeve.

* * * * *